(12) United States Patent
Bhagwan et al.

(10) Patent No.: US 8,359,652 B2
(45) Date of Patent: Jan. 22, 2013

(54) DETECTING ANOMALIES IN ACCESS CONTROL LISTS

(75) Inventors: Ranjita Bhagwan, Bangalore (IN); Tathagata Das, Bangalore (IN); Prasad G. Naldurg, Bangalore (IN)

(73) Assignee: Microsoft Corporation, Redmond, WA (US)

(*) Notice: Subject to any disclaimer, the term of this patent is extended or adjusted under 35 U.S.C. 154(b) by 516 days.

(21) Appl. No.: 12/610,309

(22) Filed: Oct. 31, 2009

(65) Prior Publication Data

US 2011/0107418 A1    May 5, 2011

(51) Int. Cl.
 *H04L 29/00* (2006.01)
(52) U.S. Cl. .............................. 726/25; 726/1
(58) Field of Classification Search .................. None
 See application file for complete search history.

(56) References Cited

U.S. PATENT DOCUMENTS

| | | | |
|---|---|---|---|
| 5,758,344 A | 5/1998 | Prasad | |
| 7,096,502 B1* | 8/2006 | Fox et al. | 726/25 |
| 7,185,367 B2 | 2/2007 | Munson | |
| 7,624,424 B2* | 11/2009 | Morita et al. | 726/1 |
| 2002/0032871 A1 | 3/2002 | Malan | |
| 2007/0143552 A1 | 6/2007 | Rastogi | |
| 2008/0091682 A1 | 4/2008 | Lim | |
| 2008/0104663 A1* | 5/2008 | Tokutani et al. | 726/1 |
| 2008/0250497 A1 | 10/2008 | Mullarkey | |
| 2008/0256593 A1* | 10/2008 | Vinberg et al. | 726/1 |
| 2008/0295145 A1* | 11/2008 | Haswarey et al. | 726/1 |
| 2009/0007219 A1* | 1/2009 | Abzarian et al. | 726/1 |
| 2009/0178102 A1* | 7/2009 | Alghathbar et al. | 726/1 |
| 2010/0043051 A1* | 2/2010 | Deputat et al. | 726/1 |

OTHER PUBLICATIONS

Al-Shaer et al., Discovery of Policy Anomalies in Distributed Firewall, IEEE, 2004.*
Bauer et al., Detecting and Resolving Policy Misconfigurations in Access-Control System, ACM, 2008.*
Tran, Misconfiguration Analysis of Network Access Control Policies, 2008.*
Aldhizer III, G. R., The insider threat: Automated identify and access controls can help organizations mitigate risks to important data, Apr. 2008, retrieved from http://findarticles.com/p/articles/mi_m4153/is_2_65/ai_n25449309/.
Al-Shaer, E. S., H. H. Hamed, Discovery of policy anomalies in distributed firewalls, Proc. of the 23rd Annual Joint Conference of the IEEE Computer and Communications Societies, INFOCOM 2004, Mar. 7-11, 2004, Hong Kong, China.

(Continued)

*Primary Examiner* — Minh Dinh
(74) *Attorney, Agent, or Firm* — Lyon & Harr, L.L.P; Craig S. Fischer

(57) ABSTRACT

An access control anomaly detection system and method to detect potential anomalies in access control permissions and report those potential anomalies in real time to an administrator for possible action. Embodiments of the system and method input access control lists and semantic groups (or any dataset having binary matrices) to perform automated anomaly detection. This input is processed in three broad phases. First, policy statements are extracted from the access control lists. Next, object-level anomaly detection is performed using thresholds by categorizing outliers in the policies discovered in the first phase as potential anomalies. This object-level anomaly detection can yield object-level security anomalies and object-level accessibility anomalies. Group-level anomaly detection is performed in the third phase by using semantic groups and user sets extracted in first phase to find maximal overlaps using group mapping. This group-level anomaly detection can yield group-level security anomalies and group-level accessibility anomalies.

20 Claims, 11 Drawing Sheets

OTHER PUBLICATIONS

Ammann, P., D. Wijesekera, S. Kaushik, Scalable, graph-based network vulnerability analysis, Proc. of the 9th ACM Conf. on Computer and Comm. Security, CCS 2002, Nov. 18-22, 2002, pp. 217-224, Washington, DC, USA.

Bartal, Y., A. J. Mayer, K. Nissim, A. Wool, Firmato: A novel firewall management toolkit, ACM Trans. Comput. Syst., Nov. 2004, vol. 22, No. 4, pp. 381-420.

Bauer, L., S. Garriss, M. K. Reiter, Detecting and resolving policy misconfigurations in access-control systems, Proceedings of the 13th ACM Symposium on Access Control Models and Technologies, SACMAT 2008, Jun. 11-13, 2008, pp. 185-194, Estes Park, CO, USA.

Dunagan, J., A. X. Zheng, D. R. Simon, Heat-ray: Combating identity snowball attacks using machine learning, combinatorial optimization and attack graphs, Proc. of the 22nd ACM Symposium on Operating Systems Principles 2009, SOSP 2009, Oct. 11-14, 2009, pp. 305-320, Big Sky, Montana, USA.

Frank, M., D. A. Basin, J. M. Buhmann, A class of probabilistic models for role engineering, Proc. of the 2008 ACM Conf. on Comp. and Comm. Security, CCS 2008, Oct. 27-31, 2008, pp. 299-310, Alexandria, Virginia, USA.

Jaeger, T., X. Zhang, F. Cacheda, Policy management using access control spaces, ACM Trans. Inf. Syst. Secur., Aug. 2003, vol. 6, No. 3, pp. 327-364.

Josh, A., S. T. King, G. W. Dunlap, P. M. Chen, Detecting past and present intrusions through vulnerability-specific predicates, Proc. of the 20th ACM Symposium on Operating Sys's Principles 2005, SOSP 2005, Oct. 23-26, 2005, pp. 91-104, Brighton, UK.

King, S. T., P. M. Chen, Backtracking intrusions, ACM Trans. Comput. Syst., Feb. 2005, pp. 51-76, vol. 23, No. 1.

Lund, C., M. Yannakakis, On the hardness of approximating minimization problems, J. ACM, Sep. 1994, pp. 960-981, vol. 41, No. 5.

Deri, L., S. Suin, G. Maselli, Design and implementation of an anomaly detection system: An empirical approach, Proc. of Terena Networking Conf., May 2003, pp. 1-20, Zagreb, Croatia.

Mayer, A. J., A. Wool, E. Ziskind, Fang: A firewall analysis engine, IEEE Symposium on Security and Privacy, May 14-17, 2000, pp. 177-187, Berkeley, California, USA.

Molloy, I., H. Chen, T. Li, Q. Wang, N. Li, E. Bertino, S. B. Calo, J. Lobo, Mining roles with semantic meanings, Proc. of the 13th ACM Symposium on Access Control Models and Technologies, SACMAT 2008, pp. 21-30, Jun. 11-13, 2008, Estes Park, CO, USA.

Reeder, R. W., L. Bauer, L. F. Cranor, M. K. Reiter, K. Vaniea, Effects of access-control policy conflict-resolution methods on policy-authoring usability, Mar. 17, 2009, pp. 1-15, CMU-CyLab-09-006, CyLab, Carnegie Mellon University.

Sandhu, R. S., E. J. Coyne, H. L. Feinstein, C. E. Youman, Role-based access control models, IEEE Computer, Feb. 1996, pp. 38-47, vol. 29, No. 2.

Schlegelmilch, J., U. Steffens, Role mining with Orca, Proc. of the 10th ACM Symposium on Access Control Models and Technologies, SACMAT 2005, Jun. 1-3, 2005, pp. 168-176, Stockholm, Sweden.

Sheyner, O., J. W. Haines, S. Jha, R. Lippmann, J. M. Wing, Automated generation and analysis of attack graphs, IEEE Symposium on Security and Privacy, May 12-15, 2002, pp. 273-284, Berkeley, California, USA.

Vaidya, J., V. Atluri, J. Warner, RoleMiner: Mining roles using subset enumeration, ACM Conf. on Comp. and Comm. Security, Proc. of the 13th ACM Conf. on Comp. and Comm. Security, CCS 2006, Oct. 30-Nov. 3, 2006, pp. 144-153, Alexandria, VA, USA.

Yan, C., Z. Qin, Y. Shi, Sequence analysis and anomaly detection of web service composition, Int'l Conf. on Comp. Science and Software Eng'g, CSSE 2008, Dec. 12-14, 2008, pp. 1043-1048, vol. 3, Wuhan, China.

Yuan, L., J. Mai, Z. Su, H. Chen, C.-N. Chuah, P. Mohapatra, Fireman: A toolkit for FIREwall Modeling and ANalysis, 2006 IEEE Symposium on Security and Privacy, S&P. 2006, May 21-24, 2006, pp. 199-213, Berkeley, California, USA.

Zhang, D., K. Ramamohanarao, T. Ebringer, Role engineering using graph optimisation, Proc. of the 12th ACM Symposium on Access Control Models and Technologies, SACMAT 2007, Jun. 20-22, 2007, pp. 139-144, Sophia Antipolis, France.

Wool, A., Architecting the Lumeta firewall analyzer, Proc. of the 10th Conf. on USENIX Security Symposium, Aug. 2001, pp. 1-13, vol. 10, USENIX Association, Washington D.C., USA.

\* cited by examiner

| NO. | USER SET | GROUP MAP | OBJECT SET |
|---|---|---|---|
| 1 | {C, D} | Z | {15,16} |
| 2 | {C, D, E, F, G} | Z ∪ {E} ∪ {F} ∪ {G} | {6,7} |
| 3 | {A, B, C, D} | Y ∪ {D} | {9,10,11,12} |
| 4 | {A, B, C, D, I} | Y ∪ {D} ∪ {I} | {13} |
| 5 | {C, D, E, F, G, H,} | X – {J} | {1,2,3,4,5} |

DETECTING ANOMALIES IN ACCESS CONTROL LISTS

BACKGROUND

Many enterprises use access control policies to control access to shared resources. These policies typically are based on organizational or functional roles, whether explicitly or otherwise. The inherent dynamism in information sharing needs in the enterprise, the heterogeneity of underlying access mechanisms, and the complexity of role engineering all serve to make maintaining consistent access control in these settings a difficult problem.

By way of example, assume an enterprise has an employee, Alice, who moves to a different role within the enterprise. However, Alice still consults with her old group periodically, and requires access to files in projects that she is maintaining. However, for compliance reasons, Alice may be prevented from accessing certain folders to which she formerly had access, but that contain new information (such as information created by new hires in her former group). An administrator may be unable to match these conflicting needs without restructuring the internal file and directory hierarchies, introducing permission vulnerabilities that conflict with the intended policy, or both.

As another example, assume that the enterprise hires a new temporary employee named Bob. Bob is tasked to work on projects A and B. An administrator needs to provide Bob with access to documents and wikis that are relevant to projects A and B and no other, and allow him to create new files. At the end of this assignment, Bob may leave the organization and another existing employee Charlie may now be tasked to maintain these projects. Now the administrator will need to provide Charlie with all the accesses that Bob had, and will have to do this manually, potentially missing files that were created by Bob.

In both these examples, the fine-grained updates required indicate that administrators will have to modify low-level permissions (such as access lists) to enforce these policies. What makes the administrator's task even more difficult is that, more often than not, there is no high-level policy manifest to guide them through the updates. This only increases the possibility that the administrator's changes (or lack of changes) will introduce security and accessibility issues in access control. This observation is corroborated by studies that shown that access lists can be largely unstructured and difficult to maintain, and several real vulnerabilities do exist.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the access control anomaly detection system and method detect potential (or candidate) anomalies in access control permissions (such as in access control lists). Embodiments of the system and method audit one or more access control lists to identify these potential anomalies. In some embodiments of the system and method, the inputs can be any generic dataset. The only constraint is that the input dataset is specified as binary matrices. In some embodiments, the input dataset is group membership information. Any potential anomalies then are reported to an administrator through the real-time anomaly detection report. It is incumbent upon the administrator to verify the validity of the potential anomalies contained in the report and to correct those validated anomalies. Embodiments of the access control anomaly detection system and method find both object-level anomalies and group-level anomalies. Object-level anomalies are found by using a light-weight policy extraction technique in combination with a statistical approach. Group-level anomalies are found by correlating the extracted policy with semantic groups.

Embodiments of the access control anomaly detection system and method detect potential anomalies that are not caused by active adversaries, but by inadvertent misconfigurations that are difficult for an administrator to detect and rectify manually. Consequently, embodiments of the access control anomaly detection system and method assume that its inputs (such as the access control lists and well-known user groups) themselves are not tampered. In many enterprise settings, only administrators will be able to view permissions and have access to this metadata in the first place, so this assumption is reasonable.

Embodiments of the access control anomaly detection system and method finds these misconfigurations of access control lists that can cause certain individuals or groups to have unwarranted or unintended access to certain objects. With these permissions, these individuals or groups can view or (depending on the permission level) even modify the objects, thereby causing a breach of confidentiality. This is an issue taken very seriously in enterprises. On the flip side, embodiments of the access control anomaly detection system and method can also identify scenarios where a set of individuals and groups who should indeed have access to certain objects have been mistakenly denied that access, which can hinder their productivity.

Embodiments of the access control anomaly detection system and method aids administrators by generating in real time a real-time anomaly detection report containing a list of candidate anomalies so that an administrator can verify that access control permissions meet intended security and accessibility requirements. Embodiments of the system and method are fully automated, such that given the inputs the report containing a set of potential anomalies are output to the administrator in real time. In some embodiments of the system and method the administrator is expected to manually resolve whether a potential anomaly is indeed an anomaly that needs to be fixed. Embodiments of the system and method are lightweight, thereby allowing the administrator to run it periodically and perform iterative testing and refinement of access control lists. In addition, embodiments of the system and method are designed to run in environments where there is no high-level policy document or manifest that informs administrators of the "correct" thing to do. Hence, embodiments of the system and method can infer a policy manifest from low-level settings.

In some embodiments, two inputs are used to perform automated anomaly detection: (1) access control lists (ACLs) for shared objects; and (2) a list of semantically well-defined user groups or sets (called "semantic groups"). The ACLs typically contain allow or deny information for different security identifiers (including security groups), and mapping such security identifiers to objects (such as directories, files, and webpages). The semantic groups map sets of individual users or security identifiers to organizational or functional structures (such as security groups or roles). These semantic groups can be derived from organizational directories, email lists, and role charts. As noted above, however, the only requirement for the input to the system and method is that the input dataset be specified as binary matrices.

Given this input, embodiments of the access control anomaly detection system and method process the ACLs and user groups in approximately three broad phases. First, embodiments of the system and method perform policy extraction on the ACLs, wherein it infers intermediate policy statements of the form "user set U has exclusive access to object set O." The second phase is object-level anomaly detection, in which embodiments of the system and method define a thresholding technique to categorize outliers in the policies discovered in the first phase as potential anomalies. These potential object-level anomalies are further divided into object-level security anomalies and object-level accessibility anomalies. In the third phase, embodiments of the system and method perform group-level anomaly detection. The set of semantic groups is used as well as the user sets extracted in first phase to find maximal overlaps using a modified set cover algorithm that is called group mapping. The result of this processing is a set of high-level policy statements of the form "all members of group G have exclusive access to object set O." A list of group-level anomalies is generated, with these anomalies further divided into group-level security anomalies and group-level accessibility anomalies. In the second and third phases, tunable parameters include statistical thresholds that can be used to control the false positive and false negative rates. Both object-level and group-level anomalies are included in the real-time anomaly detection report displayed to the administrator.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

FIG. 9 is an exemplary example containing a table that illustrates the mapping between user sets found by the automatic policy statements extractor for the example of FIG. 5.

DETAILED DESCRIPTION

Figure 1:
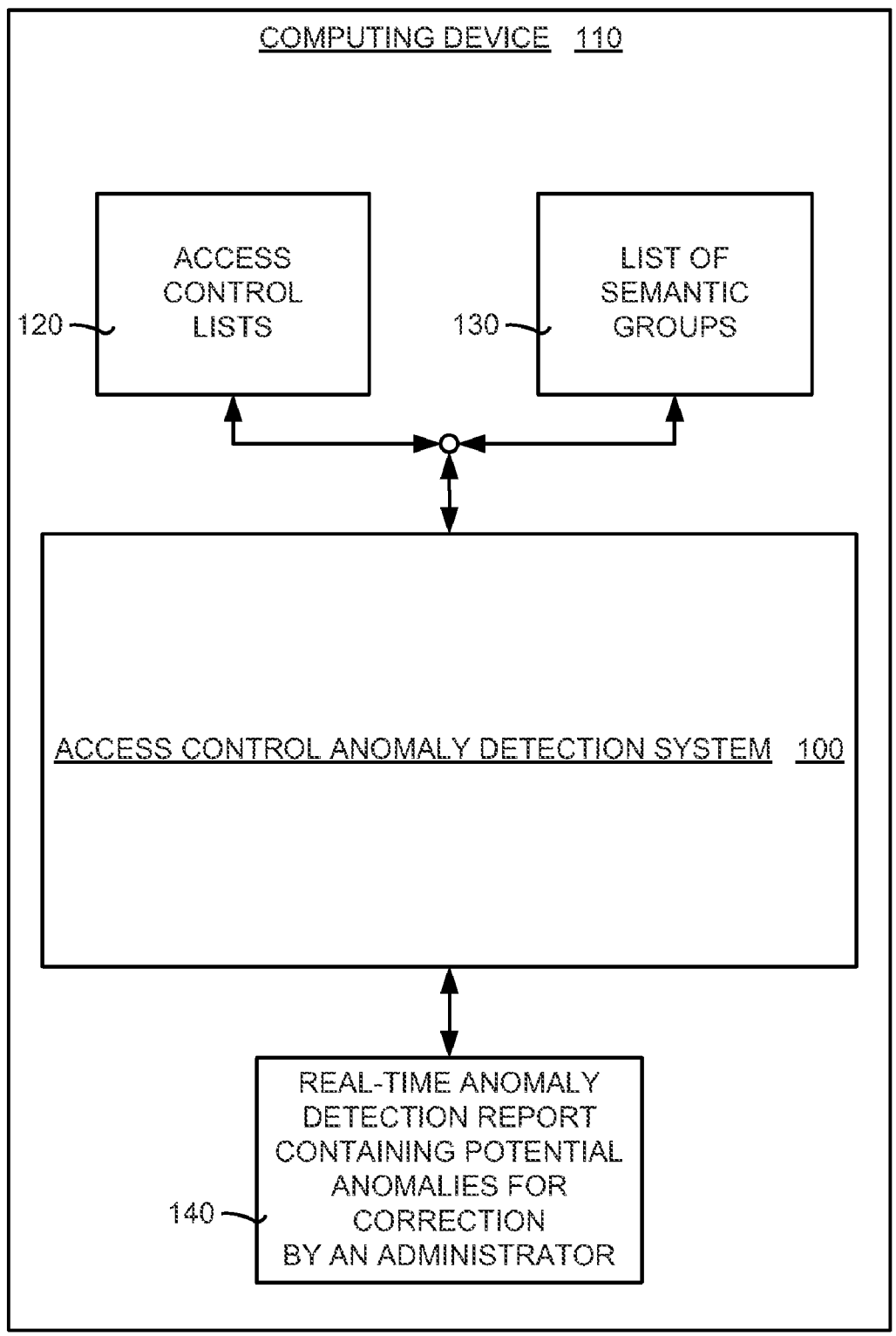
FIG. 1 is a block diagram illustrating a general overview of embodiments of the access control anomaly detection system and method implemented on a computing device.

In the following description of embodiments of the access control anomaly detection system and method reference is made to the accompanying drawings, which form a part thereof, and in which is shown by way of illustration a specific example whereby embodiments of the access control anomaly detection system and method may be practiced. It is to be understood that other embodiments may be utilized and structural changes may be made without departing from the scope of the claimed subject matter.

I. Anomaly Classifications

Prior to discussing embodiments of the access control anomaly detection system and method, the classification of access control anomalies that are generated by embodiments of the access control anomaly detection system and method will be discussed. In general, these anomalies fall into two categories: (1) accessibility anomalies; and, (2) security anomalies.

An accessibility anomaly arises when a user who, policy dictates (explicitly or otherwise), should have access to an object or a set of objects but does not have the permissions required for that access. In this scenario, access control is too restrictive and can be a hindrance to the user. A security anomaly is manifested when policy dictates that a user should not have access to an object or object set, but in reality the user has access. Such loopholes in access control can cause serious breaches in confidentiality and security.

These two broad groups of anomalies are further divided into object-level anomalies and group-level anomalies based on the way that embodiments of the access control anomaly detection system and method detect them. More specifically, the following four classes of anomalies are detected by embodiments of the access control anomaly detection system and method:

1. Object-Level Accessibility Anomaly: A user u, according to policy, should have access to an object set O. However, in reality, the user u does not have access to the object set O.

2. Object-Level Security Anomaly: A user u, according to the policy, should not have access to a given object set O. In reality, however, the user u does have access to the object set O.[0033]

3. Group-Level Accessibility Anomaly: A user u should have access to an object set O because u ∈ G, where G is a well-known group. In addition, according to policy, all users in G should have access to the object set O. However, in reality, the user u does not have access to some or all of the objects in the object set O.

4. Group-Level Security Anomaly: A user u should not have access to any objects in object set O because, according to the policy, only users in group G should have access to the objects in O, and user u not a member of the group G. However, in reality, the user u has access to one or more objects in object set O.

The first example given above outlines a practical scenario that may lead to object-level security anomalies. In particular, while the administrator might have removed Alice's access to certain directories, she may still continue to have access to some directories that she is not supposed to access any more.

On the other hand, the situation in the second example given above may lead to group-level accessibility anomalies. Specifically, Charlie does not have access to some objects that his team members involved in projects A and B have.

II. System Overview

FIG. 1 is a block diagram illustrating a general overview of embodiments of the access control anomaly detection system 100 and method implemented on a computing device 110. In general, embodiments of the access control anomaly detection system 100 and method continuously monitor the input dataset (such as the access control list), reports any changes therein, runs the anomaly detection techniques described herein, and immediately reports any anomalies to an administrator in real time. More specifically, embodiments of the access control anomaly detection system 100 shown in FIG. 1 receive access control lists 120 and a list of semantic groups 130. Embodiments of the access control anomaly detection system 100 process the access control lists 120 and the list of semantic groups 130 and output a real-time anomaly detection report containing potential (or candidate) anomalies for correction by an administrator 140. The potential anomalies can be examined by an administrator to determine whether any of the potential anomalies need to be corrected.

The access control lists 120 contain control configuration information that lists, for a set of users and a given access type, which objects uses do have access to and (optionally or as default) which objects users do not. This information is expressed in the form of a two-dimensional access matrix $M_{i,j}$. For a given permission (say read-only), a "1" in the $i^{th}$ row and the $j^{th}$ column of $U_i$ indicates that user has read-only access to object $O_j$. A "0" in the position indicates that user $U_i$ does not have access to object $O_j$. To analyze a different permission, some embodiments of the access control anomaly detection system 100 have the user enter a different matrix.

The list of semantic groups 130 is a set of semantically named user groups, G. These groups could indicate organizational roles, such as a set of senior managers, or a set of personnel associated with the legal department. On the other hand, these groups could also indicate functional roles, such as a group of users working on the development of a new product. This list of semantic groups 130 can come from a well-defined resource (like an enterprise's organizational structure database) or the enterprise's role charts, or even something as informal as the set of user-created email lists within the enterprise. In some embodiments of the access control anomaly detection system 100, email lists provide a wealth of information that organizational structure does not provide. Alternate embodiments of the access control anomaly detection system 100 vary the source of the list of semantic groups 130 depending on the enterprise.

Figure 2:
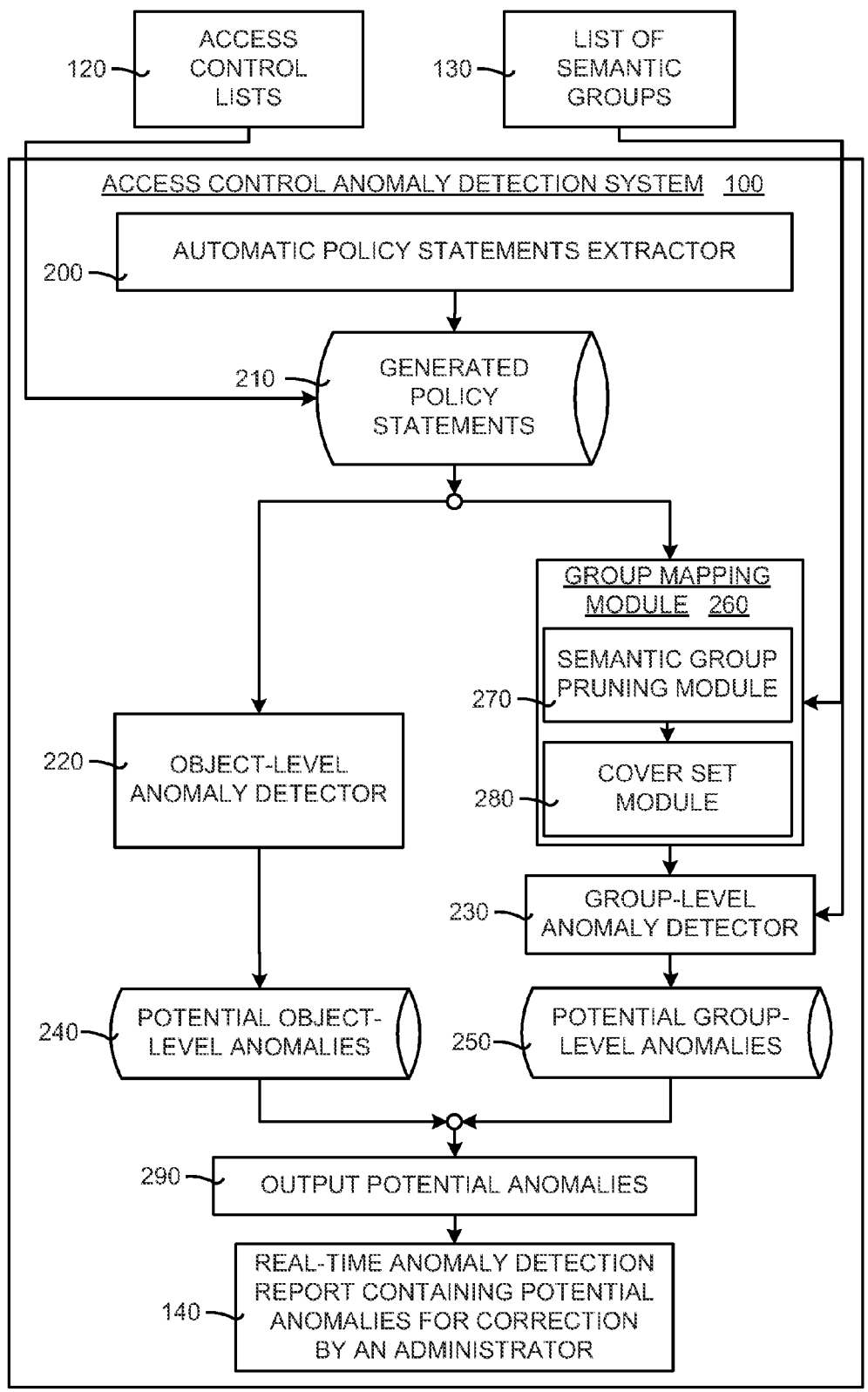
FIG. 2 is a block diagram illustrating a more details of the modules and data used in embodiments of the access control anomaly detection system and method shown in FIG. 1.

FIG. 2 is a block diagram illustrating a more details of the modules and data used in embodiments of the access control anomaly detection system 100 and method shown in FIG. 1. In particular, embodiments of the access control anomaly detection system 100 include an automatic policy statement extractor 200 that generates policy statements 210. These generated policy statements 210, along with the access control lists 120, are used by embodiments of the access control anomaly detection system 100 to generate the real-time anomaly detection report containing potential anomalies for correction by an administrator 140.

Embodiments of the access control anomaly detection system 100 include an object-level anomaly detector 220 and a group-level anomaly detector 230. The object-level anomaly detector 220 uses the access control lists 120 and the generated policy statements 210 to find potential object-level anomalies 240. The group-level anomaly detector 230 uses the access control lists 120, the generated policy statements 210, and the list of semantic groups 130 to find potential group-level anomalies 250.

The group-level anomaly detector 230 uses information from a group mapping module 260. The group mapping module 260 includes a semantic group pruning module 270 and a cover set module 280. The semantic group pruning module 270 takes the list of semantic groups and prunes them for use in the cover set module 280. The cover set module 280 finds all users that are covered (based on the set cover problem) and generates a cover set from these covered users. The remainder of the users is used to generate an unmatched user set. The group-level anomaly detector 230 then uses this information to find the potential group-level anomalies 250. Both the potential object-level anomalies 240 and the potential group-level anomalies 250 are grouped and output as potential anomalies 290. These potential anomalies 290 are candidates for correction by an administrator 140.

III. Operational Overview

Figure 3:
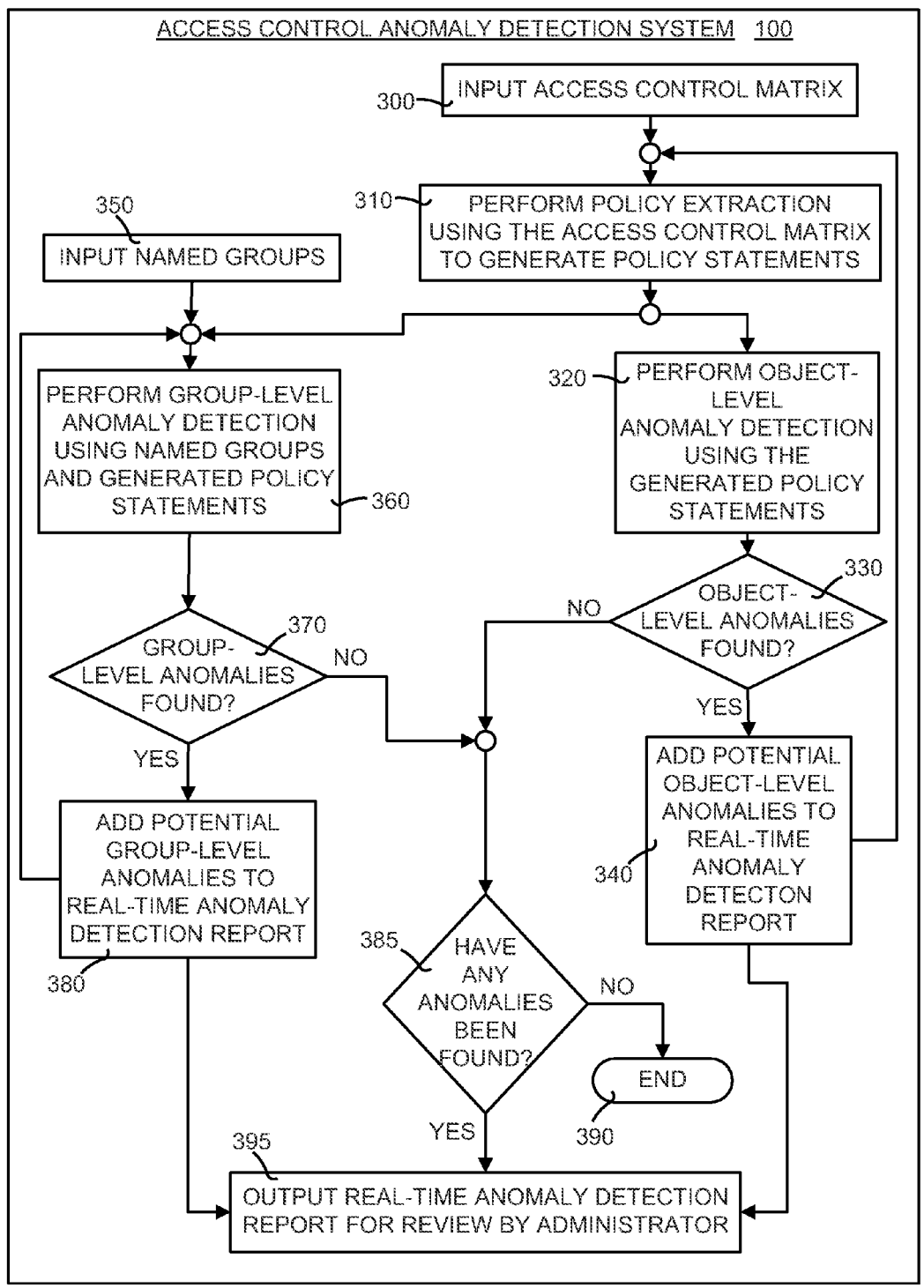
FIG. 3 is a flow diagram illustrating the general operation of embodiments of the access control anomaly detection system shown in FIGS. 1 and 2.

FIG. 3 is a flow diagram illustrating the general operation of embodiments of the access control anomaly detection system 100 shown in FIGS. 1 and 2. Referring to FIG. 3, the method begins by inputting an access control matrix (box 300). This access control matrix includes the access control lists 120. Given this input, embodiments of the access control anomaly detection method then perform an automated policy extraction to generate policy statements (box 310). These policy statements are policy pairs generated from sets of users who have similar object access. The policy statements are of the form "user set U has exclusive access to object set O." By "exclusive access", it is meant that no user, other than the members of U, has access to any of the objects in object set O.

Next, embodiments of the access control anomaly detection method perform both object-level anomaly detection and group-level anomaly detection. In some embodiments both types of detection are performed simultaneously. In particular, embodiments of the access control anomaly detection method perform object-level anomaly detection using the generated policy statements (box 320). A determination then is made as to whether any object-level anomalies have been found (box 330). If so, then the object-level anomalies are added to a real-time anomaly detection report (box 340). This report includes the potential object-level anomalies that may be corrected by an administrator.

Embodiments of the access control anomaly detection method also perform group-level anomaly detection. This detection begins by receiving as input named groups, such as the list of semantic groups 130 (box 350). Embodiments of the access control anomaly detection method then perform group-level anomaly detection using the named groups and the generated policy statements (box 360).

A determination then is made as to whether any group-level anomalies have been found (box 370). If group-level anomalies have been found, then the potential group-level anomalies are added to the real-time anomaly detection report (box 380). This report includes list of potential group-level anomalies that may be corrected by an administrator. Once each potential group-level anomaly has been found, a prioritized list of candidate group-level anomalies is displayed to a system administrator. The administrator then is free to verify these candidate anomalies to determine whether they are indeed genuine.

If no object-level anomalies are found (in box 330) or no group-level anomalies are found (in box 370), then a determination is made as to whether any anomalies have been found (box 385). If no anomalies have been found, then the process ends (box 390). Otherwise, one or both of the object-level anomaly detection phase and the group-level anomaly detection phase may be iterated until each process determines that there are no new genuine anomalies. In this case when there are anomalies found but each anomaly has been found, then the output is the real-time anomaly detection report for review by the administrator (box 395). Note that the method described above is an exemplary embodiment of the operation of embodiments of the access control anomaly detection method. In other embodiments of the access control anomaly detection method, an administrator may decide to run both object-level and group-level anomaly detection phases before fixing any existing anomalies. In still other embodiments, the administrator may decide to perform only one of the anomaly detection phases.

The real-time anomaly detection report contains a prioritized list of candidate object-level anomalies and a prioritized list of candidate group-level anomalies. This report is displayed to a system administrator. The administrator then is free to determine if any of these candidate anomalies are indeed genuine. If so, then the administrator may decide to manually fix the permissions. It should be noted that the policy extraction can be run again. This may be done since the matrix $M_{i,j}$ has changed and new object-level anomalies may emerge.

It also should be noted that an administrator can use the policy statements and the potential anomaly list from the last phase (such as group-level anomalies) to perform a restructuring of the access lists. For example, given a policy statement "users in G should have exclusive access to object set O" that is valid, an administrator can set up a new security group S, with all members of G. The administrator then may change the access lists of O to reflect the statement "S has access to O." After this change, just adding a user u to the security group S will provide that user access to all objects in O. An administrator may therefore use embodiments of the access control anomaly detection method not only as a tool for anomaly detection, but also as a stepping-stone towards more structured access control lists that are less susceptible to anomalies.

IV. System and Operational Details

The system and the operational details of embodiments of the access control anomaly detection system 100 and method now will be discussed. These embodiments include embodiments of the automatic policy statement extractor 200, the object-level anomaly detector 220, and the group-level anomaly detector 230. The system and operational details of each of these programs modules now will be discussed in detail.

IV.A. Automatic Policy Statements Extractor

Embodiments of the access control anomaly detection system 100 and method in the automatic policy statements extractor 200. In general, this extractor 200 is a preprocessing phase that generates pairs of policy statements. For purposes of this document, assume that a set of all users in the enterprise is U and the set of all objects is O. As mentioned above, the input to this preprocessing phase is an access matrix M that contains n number of users and m number of objects. In addition, for a given access type, element $M_{i,j}=1$ if user $U_i$ has access to object $O_j$ and 0 otherwise. The output of this phase is a list of candidate policy statements of the form "user set $U_k$ has exclusive access to object set $O_k$ ($U_k \rightarrow O_k$)."

By exclusive access, it is meant that for a given access permission, users in $U_k \subset U$ have access to objects in $O_k \subset O$, and no other user $u \in \overline{U-U_k}$, has access to any object $o \in O_k$. Consequently, the object sets $O_k$ in the extracted policy are disjoint, while the user sets may be overlapping. The general notion is to isolate the maximal exclusive object sets that different sets of users can access.

Figure 4:
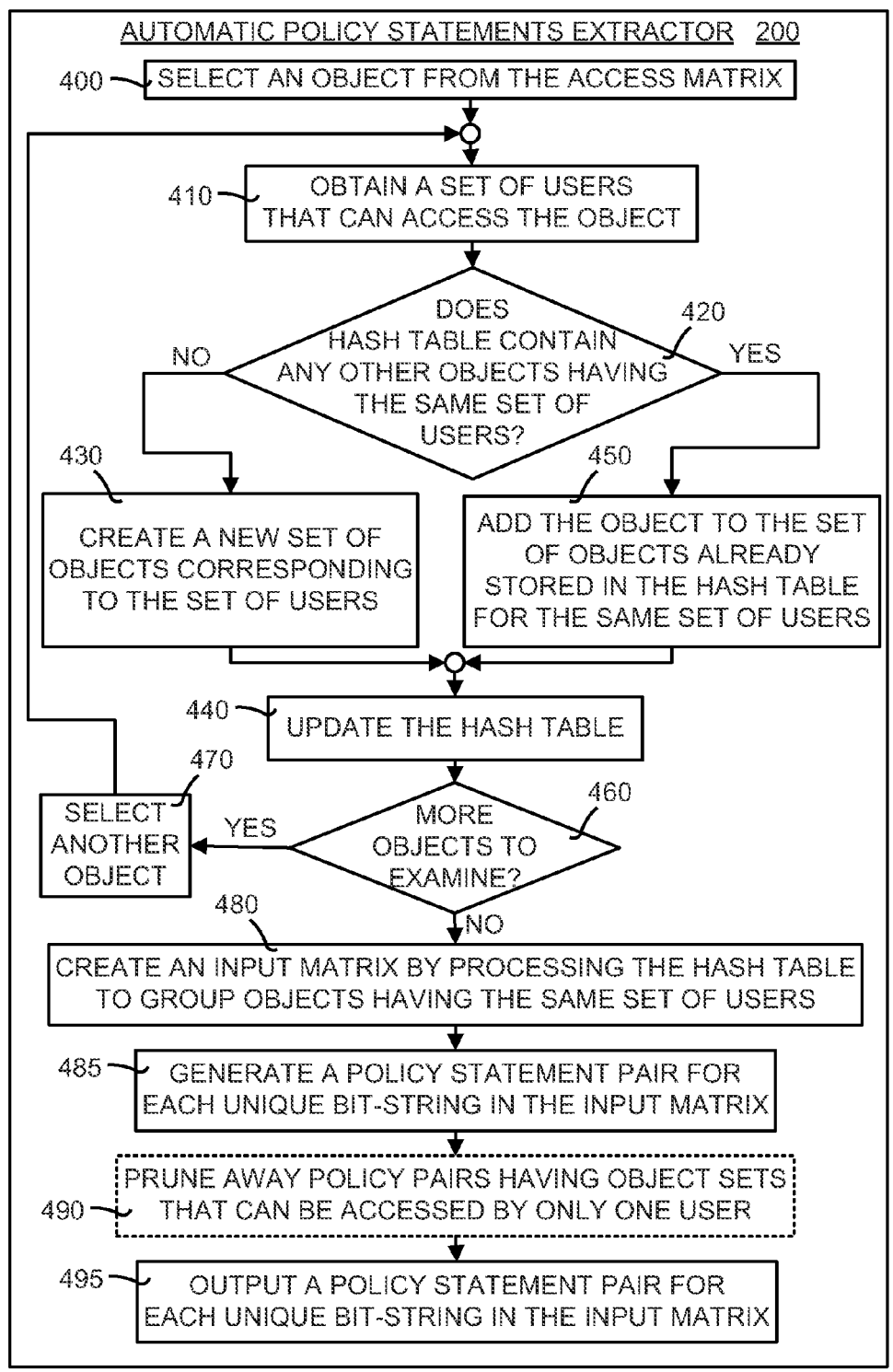
FIG. 4 is a flow diagram illustrating the operational details of embodiments of the automatic policy statements extractor shown in FIG. 2.

FIG. 4 is a flow diagram illustrating the operational details of embodiments of the automatic policy statements extractor 200 shown in FIG. 2. As shown in FIG. 4, the operation of embodiments of the automatic policy statements extractor 200 begins by selecting an object from the access matrix M that contains n number of users and m number of objects (box 400): The automatic policy statements extractor 200 is a one-pass operation over the columns of $M_{i,j}$. In addition, the extractor 200 uses a hash table H for bookkeeping.

From the hash table, the extractor 200 then obtains or identifies a set of users that is able to access the object (box 410). In other words, for each object $o \in O$, the extractor 200 identifies the set of users that have access to it. For an object whose permissions are represented by column i, the corresponding entries for that column in $M_{i,j}$ indicate which users from U have access to it. In some embodiments of the extractor 200, the column vector is represented as a bit-string, and as the key to the hash table H.

A determination then is made as to whether the hash table H contains any other objects having the same set of users (box 420). If the hash table H does not have an entry for the particular bit-string, then a new set of objects is created corresponding to the set of users (box 430). Then the extractor 200 updates the hash table by adding the bit-string as a new key to the hash table and storing o as its value. On the other hand, if the hash table H already includes this bit-string, then the extractor 200 adds the object o to the set of objects that is already stored for the bit-string in the hash table H (box 450). The hash table H is updated by adding the objects o to the set of objects in the hash table (box 440).

The process is repeated for each object by making a determination as to whether there are more objects to examine (box 460). If so, then the extractor 200 selects another, different object from the access matrix (box 470) and repeats the process. Otherwise, the extractor 200 created an input matrix by processing the hash table to group objects having the same set of users (box 480).

Next, the extractor 200 generates a policy statement pair for each unique bit-string in the input matrix (box 485). In particular, for each unique bit-string key in the hash table H (reformatted as the input matrix) the extractor 200 outputs a policy statement $[U_k \rightarrow O_k]$. Specifically, $U_k$ is obtained by looking up which users from U correspond to the 1's in the bit-string, and $O_k$ is the objects stored in the hash table H under that key. In some embodiments, as a performance optimization, the extractor 200 prunes away all policies that have object sets that can be accessed by only one user, such that there is no sharing (box 490). This is shown in FIG. 4 by dashed lines, since this is an optional process that is used in some embodiments of the automatic policy statements extractor 200. Finally, the extractor 200 outputs a policy statement pair for each unique bit-string in the input matrix (box 495). It should be noted that the operation of the extractor 200 has a trivial optimal complexity of O(nm), as each entry in the matrix is read only once.

Figure 5:
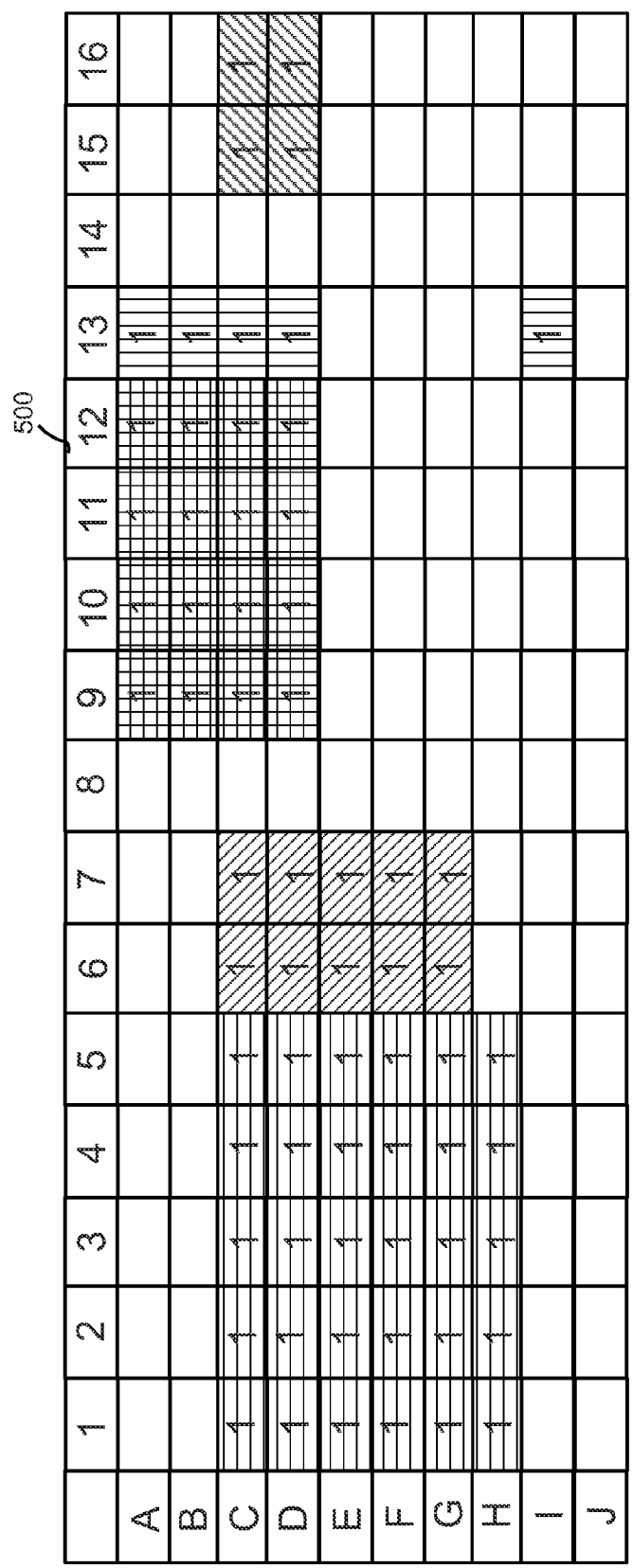
FIG. 5 is an exemplary example of an input matrix generated by the automatic policy statements extractor method shown in FIG. 4.

FIG. 5 is an exemplary example of an input matrix generated by the automatic policy statements extractor method shown in FIG. 4. In particular, FIG. 5 shows an example input matrix M 500 having 10 users and 16 objects. Each grayscale coloring within the matrix represents a different policy statement that the extractor 200 finds. Corresponding to FIG. 5, the list of policy statements generated by the extractor 200 is as follows:

(i) {C,D} has exclusive access to {15, 16}.
(ii) {C,D,E, F,G} has exclusive access to {6, 7}.

(iii) {A,B,C,D} has exclusive access to {9, 10, 11, 12}.
(iv) {A,B,C,D, I} has exclusive access to {13}.
(v) {C,D,E, F,G,H} has exclusive access to {1, 2, 3, 4, 5}.

IV.A.1. Policy Properties

The policies extracted by the automatic policy statements extractor 200, in terms of sets of users having exclusive access to disjoint sets of objects, have two very useful properties: compactness and coverage. The list of policies discovered by the extractor 200 is compact in the sense that for any pair of policy statements generated by the extractor 200, they cannot be combined to create a more general valid policy. The list of policies covers the set of objects, in the sense that for any object that is shared by more than one user, it will necessarily appear in only one policy statement.

In particular, for policy compactness, consider any pair of policy statements $[U_1 \rightarrow O_1]$ and $[U_2 \rightarrow O_2]$ generated by the extractor 200. It can be argued that two policies that cannot be combined together to create another valid but more general and more compact policy of the form $U_1 \cup U_2$ have exclusive access to $O_1 \cup O_2$. The proof follows trivially from the definition of exclusive access that any object $o_1$ in $O_1$ cannot be present in $O_2$ and have a different set of users who can access it, and vice versa. Therefore, any object can occur in only one policy statement.

For policy coverage, it can be shown that any object o in O, that can be accessed by more than one user, will be necessarily present in exactly one policy statement extracted by the extractor 200. Specifically, let there be an object o that can be accessed by a set of users U. It follows that if this user set does not have exclusive access to any objects other than o, then the policy extracted will be $[U \rightarrow o]$. If the set U of users has exclusive access to the set of objects O that includes o, where $|O|>1$, then the policy will be $[U \rightarrow O]$. Therefore, in either case, the object o will occur in a policy statement. From this argument, and from compactness, it follows that any object o will occur in exactly one policy statement.

IV.B. Anomaly Detection

In this section, the operation of the object-level anomaly detector 220 will be discussed. Embodiments of the object-level anomaly detector 220 are used to find object-level anomalies using the policy statements from the automatic policy statements extractor 200. Next, the operation of the group-level anomaly detector 230 will be discussed. Embodiments of the group-level anomaly detector 230 find group-level anomalies by using a mapping from user sets in the policy statements to semantically semantic groups. It should be noted that that the candidate anomalies found by embodiments of the access control anomaly detection system 100 are suggestions on access control configurations that the human administrator should look at to decide whether these are actual anomalies.

IV.B.1. Object-Level Anomaly Detector

Embodiments of the object-level anomaly detector 220 is based on the intuition that when the access control for a small user set is only slightly different from the access control for a much larger user set, then this might be an indication of an anomaly. In general, embodiments of the object-level anomaly detector 220 are given policy statements ($U_k, O_K$ pairs), and these policy statements are compared two at a time.

There are two types of object-level anomalies: (1) an object-level accessibility anomaly; and (2) an object-level security anomaly. The object-level accessibility anomaly deals with the case where a user should have access but does not. For example, assume there are 10 users who can access 100 objects. The only exception is the tenth user, who cannot access the $100^{th}$ object. In other words, the tenth user can access all the other 99 objects, but not the $100^{th}$ object. It is intuitive that if the tenth user can access all the other 99 objects that the other nine users can access, probably the tenth user should be able to access the $100^{th}$ object. This is an example of an object-level accessibility anomaly.

The object-level security anomaly deals with the case where a user should not have access but does. For example, using the above example, assume there is an eleventh user who can access one of the 100 objects. It might be possible that the eleventh user should not have access to any of the 100 objects. This is an object-level security anomaly.

Figure 6:
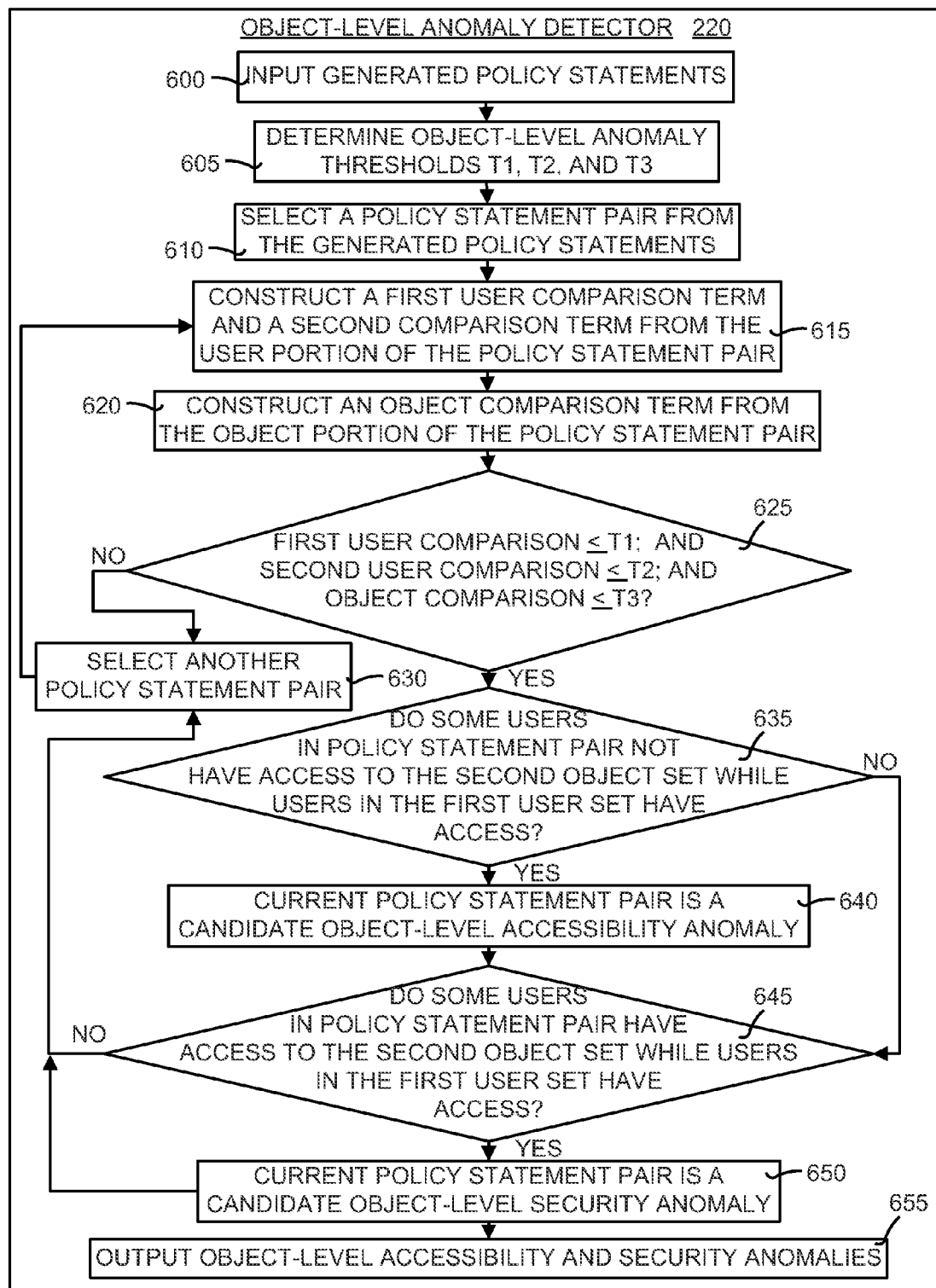
FIG. 6 is a flow diagram illustrating the operational details of embodiments of the object-level anomaly detector shown in FIG. 2.

FIG. 6 is a flow diagram illustrating the operational details of embodiments of the object-level anomaly detector 220 shown in FIG. 2. In general, embodiments of the object-level anomaly detector 220 take pairs of policy statements (such as ($U_1, O_1$) and ($U_2, O_2$) and compares $U_1$ with $U_2$ and $O_1$ and $O_2$, and determines whether it is an object-level accessibility anomaly or and object-level security anomaly.

As shown in FIG. 6, the operation of embodiments of the object-level anomaly detector 220 begins by inputting generated policy statements (box 600). Objective-level anomaly thresholds ($t_1, t_2$, and $t_3$) then are determined (box 605). These thresholds can be set either manually or automatically. Next, a policy statement pair is selected from the generated policy statements (box 610).

The detector 220 then constructs a first user comparison term and a second user comparison term from the user portion of the selected policy statement pair (box 615). Moreover, the detector 220 constructs an object comparison term from the object portion of the policy statement pair (box 620). Next, the detector 220 determines whether the first user comparison term is less than or equal to $t_1$, and whether the second user comparison term is less then or equal to $t_2$, and whether the object comparison term is less than or equal to $t_3$ (box 625). In essence, these are comparisons whereby the detector 220 compares sets of users in the two selected policy statements and determines whether there is a user that is in one set but not in the other set.

If the comparisons are untrue, then the detector 220 selects another policy statement pair (box 630). On the other hand, if the statement is true then the detector 220 determines whether some users in the policy statement pair do not have access to the second object set while users in the first user set have access (box 635). If this is true, then the current policy statement pair is a candidate object-level accessibility anomaly (box 640).

Whether the determination is true or not, the detector 220 then makes a determination whether some users in the policy statement pair have access to the second object set while users in the first user set also have access (box 645). If this is true, then the current policy statement is designated as a candidate object-level security anomaly (box 650). Then, the detector 220 then selects another policy statement pair, if available (box 630). Otherwise, the detector 220 outputs the object-level accessibility and security anomalies (box 655).

More specifically, the detector 220 matches every pair of policies in a list P with the following template:
$U_1$ has exclusive access to $O_1$.
$U_2$ has exclusive access to $O_2$.
where $|U_1 - U_2|/|U_1| \leq t_1$,
$|U_2 - U_1|/|U_1| \leq t_2$, and
$|O_2|/|O_1| \leq t_3$, and
$t_1, t_2$, and $t_3$ are threshold values, such that $0.0 < t_1, t_2, t_3 \leq 0.5$.

The constraints $|U_1 - U_2|/|U_1| \leq t_1$ and $|U_2 - U_1|/|U_1| \leq t_2$ ensure that the user sets $U_1$ and $U_2$ are similar to each other. The number of users that are present in one but not present in the other is constrained by the threshold parameters $t_1$ and $t_2$.

Hence, most users are common to both $U_1$ and $U_2$, and have access to both sets of objects $O_1$ and $O_2$.

It should be noted that users in $U^1-U_2$, when $U_1-U_2$ is not a null set, do not have access to objects in $O_2$, while the other users in $U_1$ have access. The size of the set $U_1-U_2$ is small compared to $U_1$ (ensured by $t_1$) and $|O_2|$ is also small compared to $|O_1|$ (ensured by $t_3$). Hence, it can be inferred that users in $U_1-U_2$ should also have access to the objects in $O_2$. In this situation, the detector 220 flags it as a potential accessibility anomaly.

Conversely, when $U_2-U_1$ is not a null set, this implies that a small set of users, $U_2-U_1$, has inadvertent access to objects in $O_2$ that most users in $U_1$ can access. The detector 220 flags this as a potential security anomaly. In other words, users in $U_2-U_1$ should not have access to objects in $O_2$.

Referring to the example shown in FIG. 5, assume that $t_1=t_2=t_3=0.4$. Mapping the policy statements 3, "{A,B,C,D} has exclusive access to {9, 10, 11, 12}" to "$U_1$ has exclusive access to $O_1$", and statement 4, "{A,B,C,D, I} has exclusive access to {13}" to "$U_2$ has exclusive access to $O_2$". Now, $|U_2-U_1|/|U_1|=0.25$, which is below the threshold value of 0.4, and $|O_2|/|O_1|=0.25$, which is also below the threshold. Therefore, using the above-described method, the detector 220 flags the fact that user/has access to object 13 as a security anomaly.

Similarly, the detector 220 can map policy statements 5, "{C,D,E, F,G,H} has exclusive access to {1, 2, 3, 4, 5}." to "$U_1$ has exclusive access to $O_1$" and statement 2, "{C,D,E, F,G} has exclusive access to {6, 7}." to "$U_2$ has exclusive access to $O_2$." Now, $|U_1-U_2|/|U_1|=0.2$, which is below the threshold value of 0.4, and $|O_2|/|O_1|=0.4$, which is just equal to the threshold. Therefore, the detector 220 suggests that user H should have access to objects 6 and 7, and flags this as a potential accessibility anomaly.

An administrator can tune the threshold values $t_1$, $t_2$ and $t_3$ by essentially defining what fraction of a set of users or objects should trigger an anomaly alert. Moreover, an administrator can tune the thresholds to control the number of false positives and negatives output by the detector 220. If, while manually determining whether reported alerts are in fact real anomalies, they see far too many false positives, the administrators can tune down the threshold values. Similarly, if the detector 220 does not show any anomalies at all, then the administrator can tune up the thresholds.

As an aid to the administrator, in some embodiments the detector 220 is configured to output a prioritized list of potential anomalies. In these embodiments, a heuristic is used to prioritize anomalies based on how big the anomaly sets are, as compared to the sets in the original policies. These embodiments define a simple statistic that the detector 220 uses to sort our anomalies by priority P as follows:

$$P(U_1, U_2, O_1, O_2) = 0.5 * \left(\left(1 - \frac{|\Delta U|}{|U_1|}\right) + \left(1 - \frac{|O_2|}{|O_1|}\right)\right)$$

Note that $\Delta U$ corresponds to $U_2-U_1$ or $U_1-U_2$ depending on whether it is a security or an accessibility anomaly, respectively. The detector 220 takes a simple arithmetic mean of these two relative measures. This metric captures the intuition that given two anomalies, the one with a higher priority is the one that has a smaller deviation from the original policy. In other embodiments, other metrics can be used to prioritize other kinds of priorities the administrator wants to see in the output.

IV.B.2. Group Mapping Module

Embodiments of the group mapping module 260 map users to certain groups. In particular, the general idea is that given a set of users that can access an object, and given an organization list, the module 260 finds a list of users U that correspond to an organization group. The module 260 uses a form of a set cover algorithm, where given a set of users you want to cover that set with smaller other sets of users.

For example, suppose that Chad has access to certain objects in the LCA group. What the module 260 does is take the policy statement that says that Chad and others have access to the objects, and it sees that the best rate of cover for the set of points is by using this LCA group that does not include Chad. This information is used by the group-level anomaly detector 230 to see that since Chad does not have cover by the group mapping module 260, he might be an anomaly. That person then is flagged as a potential anomaly.

The principal operation to find group-level anomalies is group mapping. This operation involves mapping the user sets found by the policy extraction phase to a minimum number of semantic groups. These semantic groups can be obtained by listing e-mail groups, security groups, or organizational roles within an enterprise. The user sets discovered by the automatic policy statements extractor 200 are compared with these semantic groups and imperfect matches may indicate potential anomalies.

IV.B.2.a. Inputs and Definitions

Suppose that the automatic policy statement extractor 200 outputs a total of/policy statements and that the number of semantic groups available is g. The input to the group mapping module 260 is the set of user sets $U=\{U_1, U_2, \ldots, U_l\}$ from the policy statements, and a set of semantic groups $G=\{G_1, G_2, \ldots, G_g\}$. The group mapping module 260 seeks to find an approximate minimum cover $C_i$ for user set $U_i$. An approximate cover $C_i$ is defined as the subset of groups in G such that the union of the elements in this group is (almost) equal to $U_i$. The minimum cover is defined as a cover such that the cardinality of $C_i$ is minimum over all possible covers for $U_i$.

The group mapping module 260 maps a set of semantic groups chosen from G to each user set $U_i$ in a policy statement. It can be shown that the group mapping problem for a given user set $U_i$ is as hard as the minimum set cover problem. Note that the minimum set cover problem is NP-Hard. In some embodiments, for efficiency, the group mapping module 260 uses a modified version of a well-known O(log(n)) greedy approximation algorithm.

The idea is to find an approximate set cover for each $U_i$. This means that it is not required that a semantic group $G_j$ cover $U_i$ exactly, unlike the well-known minimum set cover problem. In other words, $G_j$ could contain some users that are not in $U_i$ and still be in the cover set $C_i$. Also, it is not necessary that every user in $U_i$ is covered by some semantic group. Hence, the approximate set cover $C_i$ that is obtained for $U_i$ may contain some set of users that are not in $U_i$. Similarly, some users in $U_i$ may not get covered at all by any semantic group. The unmatched users in $U_i$ are stored in an unmatched users set $T_i$.

IV.B.2.b. Semantic Group Pruning Module

Figure 7:
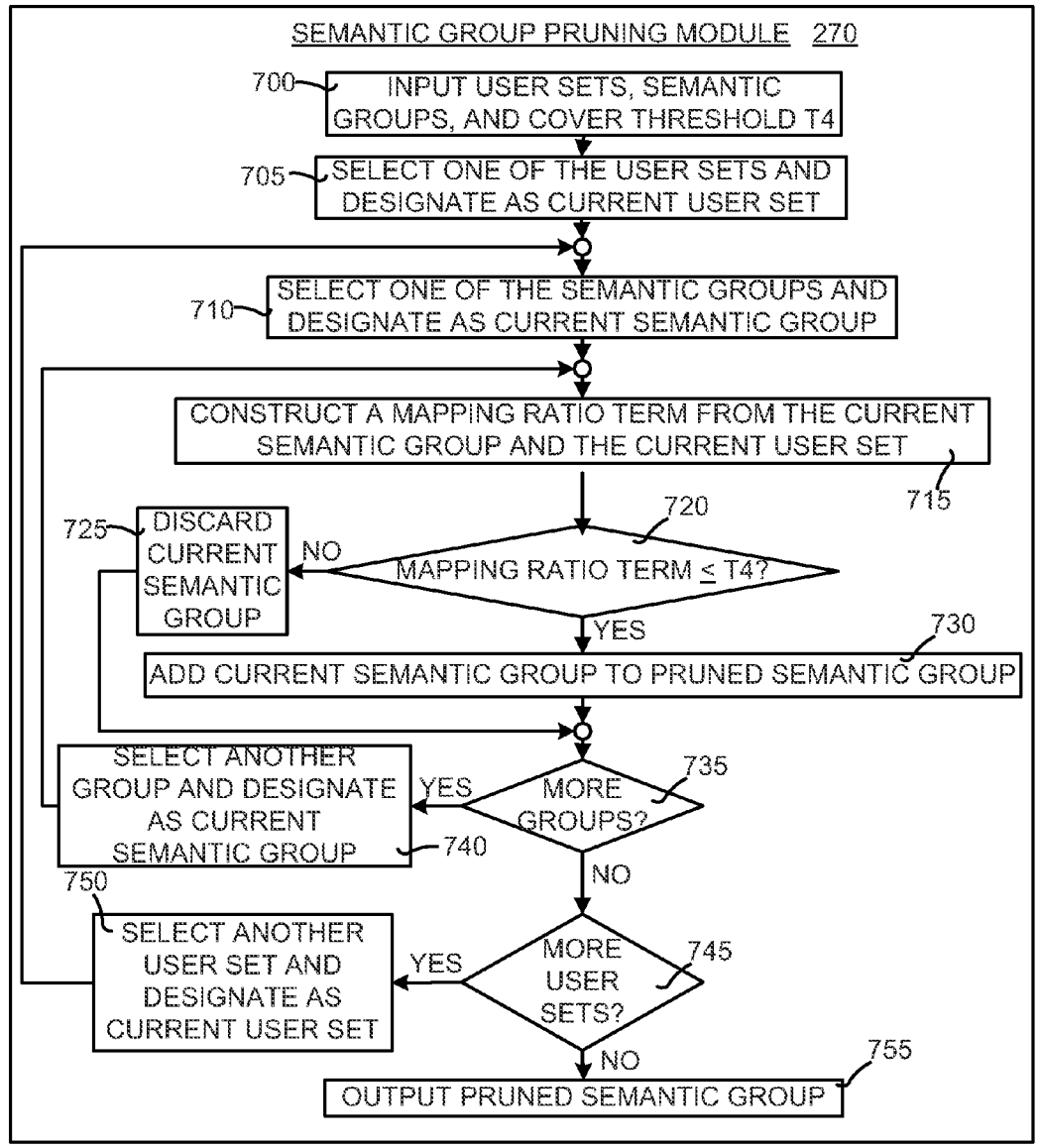
FIG. 7 is a flow diagram illustrating the operational details of embodiments of the semantic group pruning module shown in FIG. 2.

FIG. 7 is a flow diagram illustrating the operational details of embodiments of the semantic group pruning module 270 shown in FIG. 2. In general, embodiments of the semantic group pruning module 270 takes a given list of user sets $\{U_1, U_2, \ldots, U_l\}$ and outputs a pruned semantic group.

More specifically, the operation of the module 270 begins by inputting user sets, semantic groups, and a cover threshold $t_4$ (box 700). Next, one of the user sets is designated as a current user set (box 705). In addition, one of the semantic groups is selected and designated as a current semantic group (box 710).

The module 270 then constructs a mapping ration term from the current semantic group and the current user set (box 715). In particular, let G be the set of semantic user groups to be used for approximate covering. For each user set, $U_i$, the module 270 eliminates from G those semantic groups $G_j$ that do not satisfy the condition $|G_j-U_i|/|G_j| \leq t_4$.

In other words, a determination is made as to whether the mapping ratio term ($|G_j-U_i|/|G_j|$) is less than or equal to the cover threshold, $t_4$ (box 720). If not, then the current semantic group is discarded (box 725). If so, then the current semantic group is added to a pruned semantic group (box 730).

A determination is then made as to whether there are more groups (box 735). If so, then another semantic group is selected, designated as the current semantic group, and the process begins again (box 740). If not, then a determination is made as to whether there are more user sets (box 745). If so, then another user set is selected and designated as the current user set (box 750). Otherwise, the pruned semantic group is output (box 755).

IV.B.2.c. Cover Set Module

Figure 8:
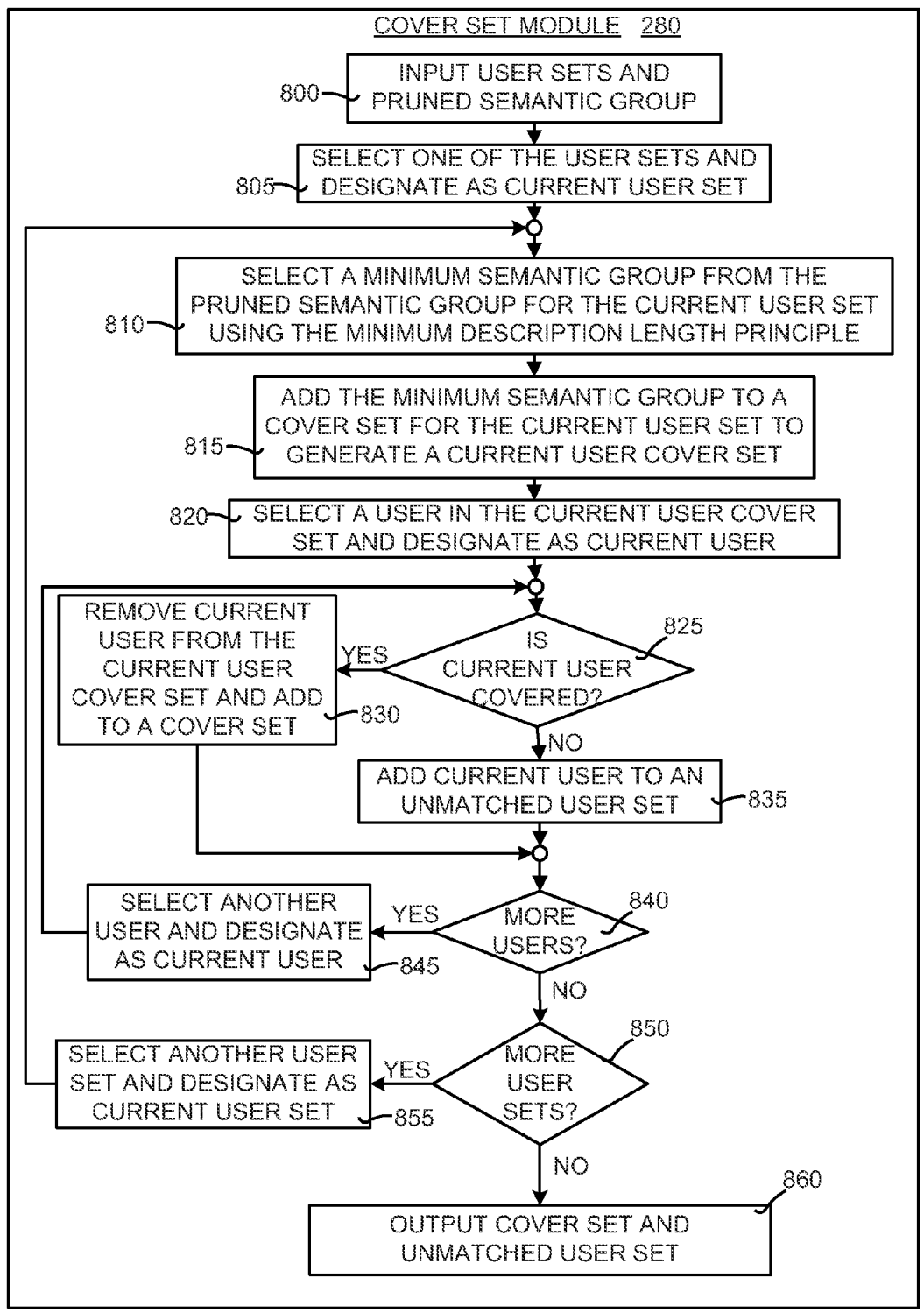
FIG. 8 is a flow diagram illustrating the operational details of embodiments of the cover set module shown in FIG. 2.

FIG. 8 is a flow diagram illustrating the operational details of embodiments of the cover set module 280 shown in FIG. 2. In general, embodiments of the cover set module 280 take the pruned semantic group and find a cover set and an unmatched users set for use by the group-level anomaly detector 230.

In particular, the operation of the cover set module 280 begins by inputting the user sets and the pruned semantic group (box 800). Next, one of the user sets is selected and designated as a current user set (box 805). The module 280 then selects a minimum semantic group from the pruned semantic group for the current user set using the minimum description length principle (box 810). Specifically, the module 280 selects an element $G_{min}$ from the pruned semantic group G such that the element covers a large number of elements in the user set $U_i$. Moreover, the module 280 makes sure that the number of elements in $G_{min}$ that are not in $U_i$ is small.

As noted above, in order to select a correct $G_{min}$, the module 280 uses the minimum description length principle. For a semantic group G, the module 280 defines the description length for $U_i$ in terms of $|U_i-G|+|G-U_i|$. Of all groups, the module 280 selects $G_{min}$ as the group with the minimum description length for $U_i$.

The module 280 then adds the minimum semantic group to a cover set for the current user set to generate a current user cover set (box 815). In other words, the module 280 adds $G_{min}$ to a cover set $C_i$ for a current user set $U_i$. Next, the module 280 selects a user in the current user cover set and designates that user as the current user (box 820).

A determination then is made as to whether the current user is covered (box 825). If so, then the current user is removed the current user cover set and added to the cover set (box 830). If not, then the current user is added to an unmatched user set (box 835). This iteration continues until all the users in $U_i$ are covered, or no $G_{min}$ is found to cover the remaining users in the current user cover set U'$_i$. In this case, all the remaining users are output as an unmatched user set $T_i$.

In particular, the module 280 determines whether there are more user (box 840). If so, then the module 280 selects another user and designates the selected user as the current user (box 845). If not, then a determination is made as to whether there are more user sets (box 850). If so, then the module 280 selects another user set and designates the selected user set as the current user set (box 855). If not, then the output of the module 280 is the cover set and the unmatched user set (box 860). The final result of the module is a mapping of semantic groups to each user set.

Using the above example in FIG. 5, assume the well-known groups corresponding to the 10 users are X={C,D,E,F,G,H,J}, Y={A,B,C}, and Z={C,D}. FIG. 9 is an exemplary example containing a table 900 that illustrates the mapping between user sets found by the automatic policy statements extractor 200 for the example of FIG. 5. It should be noted that in this example the cover threshold $t_4$ is set to a value of 0.4.

IV.B.3. Group-Level Anomaly Detector

Embodiments of the group-level anomaly detector 230 find group-level anomalies. A group-level anomaly is where a user who is not a member of a group still has access to an object that the group can also access. There are two types of group-level anomalies: (1) group-level security anomaly; and (2) group-level accessibility anomaly.

A group-level security anomaly is a security anomaly at the group level. For example, if Chad is not a member of the LCA group, but he still can access all the files that the LCA group should have access to, then this is an example of a group-level security anomaly. The reverse may also happen, such that a member of a group does not have access to objects that other members of the group have access. This is a group-level accessibility anomaly.

In general, the way embodiments of the group-level anomaly detector 230 are finding group-level anomalies is by taking some group membership information in some active directory and then collating that information with the policy statements. For example, say that the LCA group used to include Chad, but that Chad leaves the LCA group. This creates anomalies when Chad can access objects that the group can access even though Chad is no longer a member of the LCA group.

Figure 10:
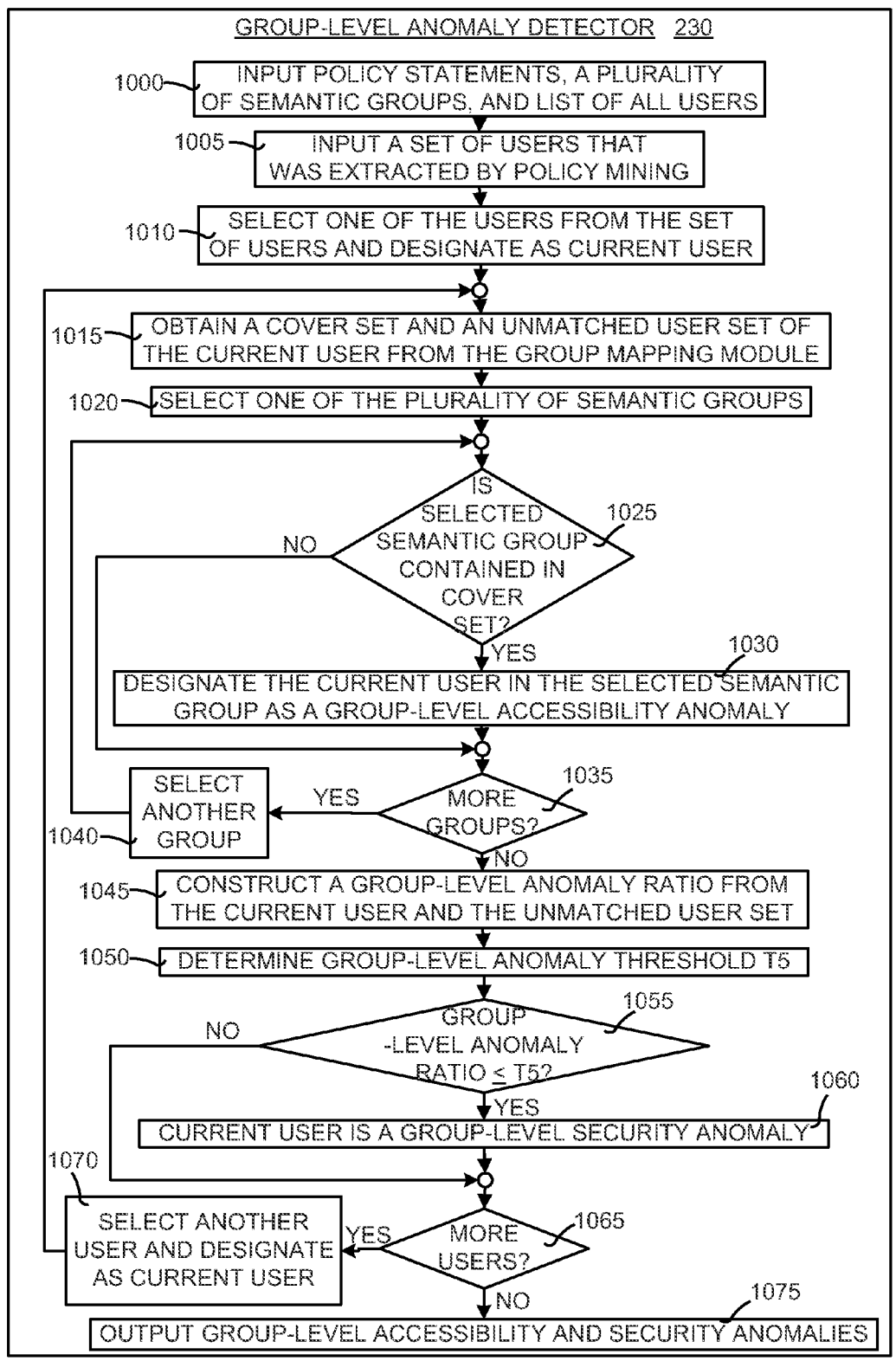
FIG. 10 is a flow diagram illustrating the operational details of embodiments of the group-level anomaly detector shown in FIG. 2.

FIG. 10 is a flow diagram illustrating the operational details of embodiments of the group-level anomaly detector 230 shown in FIG. 2. As shown in FIG. 10, once the group mapping module 260 has been run, the operation of embodiments of the group-level anomaly detector 230 begins by inputting policy statements, a plurality of semantic groups, and a list of all users (box 1000). In addition, a set of users that was extracted by policy mining is input (box 1005).

The module 230 then selects one of the users from the set of users and designates the selected user as a current user (box 1010). The module 230 then obtains a cover set and an unmatched user set of the current user from the group mapping module 260 (box 1015). For example, suppose that for a user set $U_i$, the group mapping module 260 finds the approximate cover $C_i$ as semantic groups $\{G_1, \ldots, G_c\}$, and $T_i=\{u_1, \ldots, u_d\}$ as the unmatched or leftover users. Based on this mapping, the policy statement can be written as:

G'$_1 \cup \ldots \cup$ G'$_c \cup$ T$_i$ have exclusive access to O$_i$. where G'$_j$=G$_j$-$\Delta$G$_j$, $1 \leq j \leq c$, and $\Delta$G$_j$ is the set of users in G$_j$ who are not in U$_i$. Since $|\Delta G_j|/|G_j| \leq t_4$, it can be inferred that users in $\Delta$G$_j$ should have access to O$_i$ since they are members of groups in which a majority of the users have access to O$_i$. For each j, $1 \leq j \leq c$, the module 230 flags $\Delta$G$_j$ as a group-level accessibility anomaly and infers that the policy statement should be:

G$_1 \cup \ldots \cup$ G$_c \cup$ T$_i$ have exclusive access to O$_i$.

Referring to FIG. 10, the module 230 then selects one of the plurality of semantic groups (box 1020). A determination then is made as to whether the selected semantic group is contained in the cover set (box 1025). If so, then the current user in the selected semantic group is designated as a group-level accessibility anomaly (box 1030).

In this manner the module 230 determines group-level accessibility anomalies. In FIG. 9, the fifth row of the table 900 illustrates an example of a potential group accessibility anomaly. All members of X except J have access to {1, 2, 3, 4, 5}. The system 100 informs the administrator that J might be unnecessarily barred from accessing these objects.

Irrespective of the determination, the module 230 next makes a determination whether there are more groups (box 1035). If so, another group is selected (box 1040). If not, then the module 230 constructs a group-level anomaly ratio from the current user and the unmatched user set (box 1045). Specifically, if a user u is a member of $U_i$, and if the user is also a member of a well-known group $G_j$ that is a part of the cover set $C_i$, then u will never be a member of the unmatched user set $T_i$. This indicates that none of the members in $T_i$ fall into any semantic group that is in $C_i$, and it can be inferred that they have access to an object set that they probably should not be able to access.

The module 230 then determines a group-level anomaly threshold, $t_5$ (box 1050). Similar to the other thresholds used by the system 100, $t_5$ is defined as the group-level anomaly threshold, where if $|T_i|/|U_i| \leq t_5$, then the system 100 flags this as a group security anomaly. The system 100 then infers that the policy statement should be:

$G_1 \cup \ldots \cup G_c$ have exclusive access to $O_i$.

Referring to FIG. 9, the third row of the table 900 illustrates a potential group security anomaly. In particular, each member of the well-known group Y have access to {9, 10, 11, 12}. In addition, so does D, even though it is not a member of Y. The system 100 brings this to the attention of the administrator. It should be noted that the cover threshold, $t_4$, and the group-level anomaly threshold, $t_5$, can be tuned by the administrator in order to control false positive and false negative rates.

Referring again to FIG. 10, the module 230 determines whether the group-level anomaly ratio is less than or equal to the group-level anomaly threshold, $t_5$ (box 1055). If so, then the current user is designated as a group-level security anomaly (box 1060). Either way, the module 230 then makes a determination as to whether there are more users (box 1065). If so, then the module 230 selects another user and designates the selected user as the current user (box 1070). Otherwise, the module 230 stops the iteration and outputs the group-level accessibility anomalies and the group-level security anomalies (box 1075).

IV.B.4. Anomaly Prioritization

The system 100 also uses heuristics for prioritization of group-level anomalies. The metrics are different for group accessibility and security anomalies, and correspond naturally to the biases desirable to see in the data. However, these metrics are not necessary for the functionality of operation of the group-level anomaly detector 230.

In some embodiments for group-level accessibility anomalies, for a given $U_i$, a priority is computed over each semantic group $G_j$ in $C_i$, and is defined as, $$P_{acc}[U_i, C_i] = \frac{|U_i| - \sum_{j=1}^{c} |\Delta G_j|}{|U_i|}$$

This means that the lower is the fraction of the group's users excluded from access, the higher is the possibility that it is a serious issue. In case of the security anomaly, the module 230 can use the fraction of potentially unauthorized users to prioritize as follows:

$$P_{secu}[U_i, T_i] = \frac{|U_i| - |T_i|}{|U_i|}$$

V. Exemplary Operating Environment

Embodiments of the access control anomaly detection system 100 and method are designed to operate in a computing environment. The following discussion is intended to provide a brief, general description of a suitable computing environment in which embodiments of the access control anomaly detection system 100 and method may be implemented.

Figure 11:
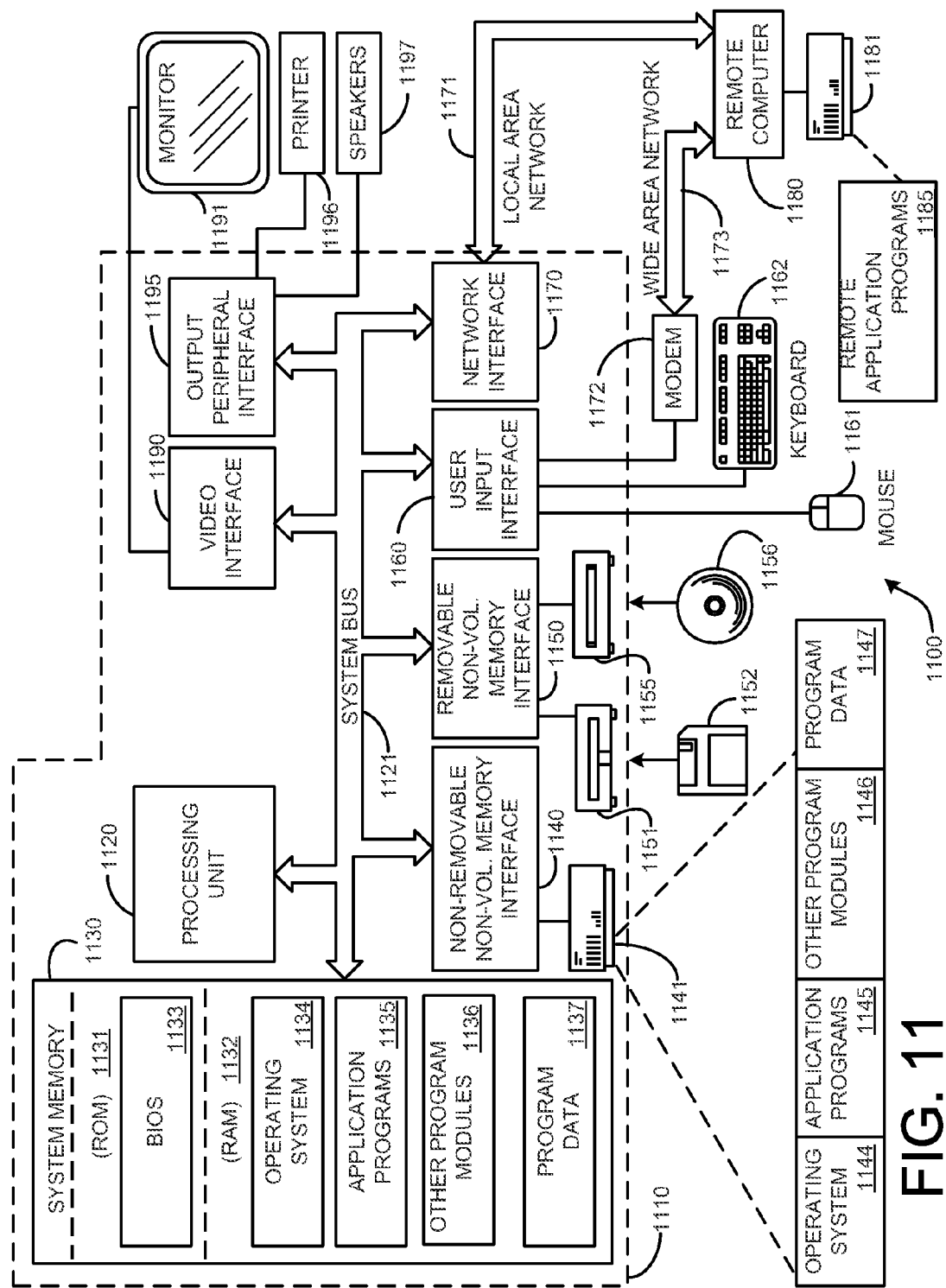
FIG. 11 illustrates an example of a suitable computing system environment in which embodiments of the access control anomaly detection system 100 and method shown in FIGS. 1-10 may be implemented.

FIG. 11 illustrates an example of a suitable computing system environment in which embodiments of the access control anomaly detection system 100 and method shown in FIGS. 1-10 may be implemented. The computing system environment 1100 is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment.

Embodiments of the access control anomaly detection system 100 and method are operational with numerous other general purpose or special purpose computing system environments or configurations. Examples of well known computing systems, environments, and/or configurations that may be suitable for use with embodiments of the access control anomaly detection system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the access control anomaly detection recommendation system 100 and method may be described in the general context of computer-executable instructions, such as program modules, being executed by a computer. Generally, program modules include routines, programs, objects, components, data structures, etc., that perform particular tasks or implement particular abstract data types. Embodiments of the access control anomaly detection system 100 and method may also be practiced in distributed computing environments where tasks are performed by remote processing devices that are linked through a communications network. In a distributed computing environment, program modules may be located in both local and remote computer storage media including memory storage devices. With reference to FIG. 11, an exemplary system for embodiments of the access control anomaly detection system 100 and method includes a general-purpose computing device in the form of a computer 1110.

Components of the computer 1110 may include, but are not limited to, a processing unit 1120 (such as a central processing unit, CPU), a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1110 typically includes a variety of computer readable media. Computer readable media can be any available media that can be accessed by the computer 1110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1110. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within the computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information (or data) into the computer 1110 through input devices such as a keyboard 1162, pointing device 1161, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1120 through a user input interface 1160 that is coupled to the system bus 1121, but may be connected by other interface and bus structures, such as, for example, a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method implemented on a computing device having a processor for detecting candidate anomalies in an access control list, comprising:
   using the computing device having the processor to perform the following:
   inputting the access control list and a list of semantic groups;
   extracting policy statements from the access control list;
   detecting any candidate object-level anomalies using the extracted policy statements;
   generating a real-time anomaly detection report containing the candidate object-level anomalies; and
   presenting the real-time anomaly detection report in real time to an administrator for verification and correction of the candidate object-level anomalies.

2. The method of claim 1, further comprising:
   detecting any candidate group-level anomalies by correlating the extracted policy statements with the semantic groups;
   generating the real-time anomaly detection report containing the candidate group-level anomalies; and
   presenting the real-time anomaly detection report in real time to the administrator for verification and correction of the candidate group-level anomalies.

3. The method of claim 2, further comprising:
   determining a first, second, and third object-level anomaly threshold;
   selecting a policy statement pair having a user portion and an object portion from the extracted policy statements;
   constructing a first user comparison term and a second user comparison term from the user portion of the policy statement pair; and
   constructing an object comparison term from the object portion of the policy statement pair.

4. The method of claim 3, further comprising determining that each the following is true:
   a. the first user comparison term is less than or equal to the first object-level anomaly threshold;
   b. the second user comparison term is less than or equal to the second object-level anomaly threshold; and
   c. the object comparison term is less than or equal to the third object-level anomaly threshold.

5. The method of claim 4, further comprising determining that the current policy statement pair is a candidate object-level accessibility anomaly by finding that some users in the policy statement pair do not have access to a second object set of the policy statement pair while users in a first user set to have access to the second object set.

6. The method of claim 4, further comprising determining that the current policy statement pair is a candidate object-level security anomaly by finding that some users in the policy statement pair have access to a second object set of the policy statement pair while users in a first user set also have access to the second object set.

7. The method of claim 2, further comprising:
   inputting a set of users that was extracted by mining the extracted policy statements;
   obtaining a cover set and an unmatched user set for a current user of the set of users;
   selecting a semantic group from the list of semantic groups;
   determining that the selected semantic group is contained in the cover set; and
   designating the current user in the selected semantic group as a candidate group-level accessibility anomaly.

8. The method of claim 7, further comprising:
   constructing a group-level anomaly ratio from the current user and the unmatched user set;
   determining a group-level anomaly threshold;
   determining that the group-level anomaly ratio is less than or equal to the group-level anomaly threshold; and
   designating the current user as a candidate group-level security anomaly.

9. A method implemented on a computing device having a processor for auditing an access control list to identify potential anomalies, comprising:
   using the computing device having the processor to perform the following:
   extracting from the access control list a policy statement pair having a user portion and an object portion;
   determining a first object-level anomaly threshold, a second object-level anomaly threshold, and a third object-level anomaly threshold;
   constructing a first user comparison term and a second user comparison term from the user portion;
   constructing an object comparison term from the object portion;
   finding object-level anomalies using the first and the second comparison terms, the object comparison term, and the first, second, and third anomaly thresholds;
   determining a cover set and an unmatched user set;
   finding group-level anomalies using the cover set and the unmatched user set;
   generating a real-time anomaly detection report containing the object-level anomalies and the group-level anomalies; and
   displaying the real-time anomaly detection report containing the object-level anomalies and the group-level anomalies to an administrator in real time for verification.

10. The method of claim 9, further comprising:
    selecting an object from the access control list;
    obtaining a set of users that is able to access the object;
    determining whether a hash table contains any other objects having the same set of users;
    if not, then creating a new set of objects corresponding to the set of users;
    if so, then adding the object to a set of objects already stored in the hash table for the same set of users; and
    updating the hash table.

11. The method of claim 10, further comprising:
    creating an input matrix by processing the updated hash table to group objects having the same set of users; and
    generating the policy statement pair for a unique bit-string in the input matrix.

12. The method of claim 9, further comprising determining that the first user comparison term is less than or equal to the first object-level anomaly threshold, the second user comparison term is less than or equal to the second object-level anomaly threshold, and the object comparison term is less than or equal to the third object-level anomaly threshold.

13. The method of claim 12, further comprising:
    determining that some users in the policy statement pair do not have access to a second object set while users in a first user set do have access; and
    designating the policy statement pair as a candidate object-level accessibility anomaly.

14. The method of claim 13, further comprising:
determining that some users in the policy statement pair have access to the second object set and users in the first user set also have access; and
designating the policy statement pair as a candidate object-level security anomaly.

15. The method of claim 9, further comprising:
inputting user sets and semantic groups;
determining a cover threshold;
constructing a mapping ratio term from a current semantic group from the semantic groups and a current user set from the user sets;
determining whether the mapping ration term is less than or equal to the cover threshold;
if not, then discarding the current semantic group; and
if so, then adding the current semantic group to generate a pruned semantic group.

16. The method of claim 15, further comprising:
selecting a minimum semantic group from the pruned semantic group for the current user set using a minimum description length principle;
adding the minimum semantic group to the cover set for a current user to generate a current user cover set;
determining whether the current user is covered;
if so, then removing the current user from the current user cover set and adding the current user to the cover set; and
if not, then adding the current user to the unmatched user set.

17. The method of claim 16, further comprising:
selecting a current semantic group from the semantic groups;
determining whether the current semantic group is contained in the cover set; and
if so, then designating the current user in the current semantic group as a group-level accessibility anomaly.

18. The method of claim 17, further comprising:
constructing a group-level anomaly ratio from the current user and the unmatched user set;
determining a group-level anomaly threshold;
finding that the group-level anomaly ratio is less than or equal to the group-level anomaly threshold; and
designating the current user as a group-level security anomaly.

19. A computer-implemented method for finding anomalies in an access control list, comprising:
grouping objects in a hash table having a same set of users to create an input matrix;
extracting a policy statement pair from the access control list by generating the policy statement pair for a unique bit-string in the input matrix;
obtaining three object-level anomaly thresholds;
constructing a first user comparison term and a second user comparison term from a user portion of the policy statement pair;
constructing an object comparison term from an object portion of the policy statement pair;
determining that the first user comparison term, the second user comparison term, and the object comparison term are less than or equal to the respective object-level anomaly thresholds;
finding a candidate object-level accessibility anomaly by determining that some users in the policy statement pair do not have access to a second object set while users in a first object set do have access;
finding a candidate object-level security anomaly by determining that some users in the policy statement pair have access to the second object set and that users in the first user set also have access;
performing group mapping to generate a cover set and an unmatched user set;
determining group-level accessibility anomalies and group-level security anomalies using the cover set and the unmatched user set;
generating a real-time anomaly detection report containing the candidate object-level accessibility anomalies, the object-level security anomalies, the group-level accessibility anomalies, and the group-level security anomalies; and
displaying the real-time anomaly detection report in real time to an administrator.

20. The computer-implemented method of claim 19, further comprising:
obtaining a set of users that was extracted by policy mining;
selecting a current semantic group from a set of semantic groups;
determining whether the current semantic group is contained in the cover set;
if so, then designating the current user in the current semantic set as a group-level accessibility anomaly;
constructing a group-level anomaly ratio from the current user and the unmatched user set;
obtaining a group-level anomaly threshold;
determining whether the group-level anomaly ratio is less than or equal to the group-level anomaly threshold; and
if so, then designating the current user as a group-level security anomaly.

* * * * *